United States Patent
Böhm et al.

[19]

[11] Patent Number: 5,876,038

[45] Date of Patent: *Mar. 2, 1999

[54] METALLIC CYLINDER HEAD GASKET

[75] Inventors: Klaus Böhm, Idstein; Stephan Bruckert, Konigstein, both of Germany

[73] Assignee: Elring Klinger GmbH, Dettingen, Germany

[21] Appl. No.: 565,156

[22] Filed: Nov. 30, 1995

[*] Notice: This patent issued on a continued prosecution application filed under 37 CFR 1.53(d), and is subject to the twenty year patent term provisions of 35 U.S.C. 154(a)(2).

[30] Foreign Application Priority Data

Apr. 26, 1995 [DE] Germany .......................... 195 15 329.4
Sep. 2, 1995 [DE] Germany .......................... 195 32 498.6

[51] Int. Cl.$^6$ ................. F16J 15/08; F02F 11/00
[52] U.S. Cl. ........................... 277/593; 277/595
[58] Field of Search ................... 277/593, 594, 277/595

[56] References Cited

U.S. PATENT DOCUMENTS

| | | | |
|---|---|---|---|
| 4,519,619 | 5/1985 | Doyle | 277/594 |
| 4,767,124 | 8/1988 | Udagawa | 277/235 B |
| 5,078,413 | 1/1992 | Miyaoh | 277/235 B |
| 5,120,078 | 6/1992 | Udagawa | 277/235 B |
| 5,306,023 | 4/1994 | Udagawa | 277/235 B |
| 5,449,181 | 9/1995 | Miyaoh | 277/235 B |
| 5,511,796 | 4/1996 | Udagawa | 277/180 |
| 5,626,348 | 5/1997 | Takada et al. | 277/593 |

FOREIGN PATENT DOCUMENTS

| | | |
|---|---|---|
| 230804 | 6/1990 | European Pat. Off. . |
| 306766 | 4/1992 | European Pat. Off. . |
| 39 15 566 A1 | 11/1989 | Germany . |
| 175579 | 6/1992 | Japan .............. 277/235 B |

*Primary Examiner*—Anthony Knight
*Assistant Examiner*—John L. Beres
*Attorney, Agent, or Firm*—Alix, Yale & Ristas, LLP

[57] ABSTRACT

A metallic cylinder head gasket for an internal combustion engine having cylinder liners, the gasket comprising at least one cover plate which has a plurality of openings, commensurate with the combustion chambers of an internal combustion engine. The gasket has beads which extend around the openings, the beads being arranged at a distance from the edges of the openings. An annular upward extension is arranged concentrically with respect to each bead and serves as an upward extension of the combustion space and as a deformation limiter for the bead. The gasket is provided with at least one flat carrier plate. The upward extensions are formed by rings which are supported by the liner collars.

12 Claims, 3 Drawing Sheets

METALLIC CYLINDER HEAD GASKET

FIELD OF THE INVENTION

This invention relates to cylinder head gaskets and, particularly, to metallic cylinder head gaskets for internal combustion engines having cylinder liners. More specifically, the present invention is directed to improving the performance and durability of multilayer, metallic cylinder head gaskets and, especially, to the fabrication of such gaskets with bead deformation limiters. Accordingly, the general objects of the present invention are to provide novel and improved methods and apparatus of such character.

BACKGROUND OF THE INVENTION

Published European patent documents EP-C-0 206 766 and EP-C-0 230 804 disclose metallic cylinder head gaskets for internal combustion engines, such gaskets comprising a carrier plate and at least one cover plate having resilient sealing projections, i.e., beads. The gap between the cylinder head and cylinder block of an internal combustion engine varies during operation as a function of the working cycle of the adjacent cylinder. A gasket disposed in the gap is subjected to constant changes in pressure and must have durable resilience properties in order to maintain a satisfactory seal.

In the gaskets of the above-identified publications, the head/block gap is sealed by means of an upward extension of the cylinder head gasket, which extends about the combustion space, in cooperation with a bead lying behind the extension. The bead, being resilient, follows vertical movements of the cylinder head in relation to the cylinder block in response to the ignition pressure. On the one hand, no unacceptably large deformation must occur when the bead is subjected to maximum compressive loading. On the other hand, the compressive force applied to the bead must not be completely released but, rather, must be maintained at least at a level which will ensure a minimum deformation with the maximum cylinder pressure. The working range of the bead thus lies between these two limits of deformation.

In order to ensure proper functioning, the bead must therefore not be completely deformed either during the installation of the gasket or in the operating state. An unacceptably large deformation of the bead vertically with respect to the plane of the gasket is prevented in known gaskets by means of a deformation limiter of constant thickness. The deformation limiter also serves to extend the gasket upwardly along the combustion space.

Prior art gaskets as exemplified by the above identified publications are not suitable for use on internal combustion engines having cylinder liners since the vertical forces which arise when the gasket is being clamped in position, or which exist after installation, are applied at the edge of the combustion space and thus essentially to the cylinder liner. These forces produce tilting moments on the liner. This occurs, in particular, if the distance between adjacent cylinder bores is small.

The object of the invention is to provide a cylinder head gasket which is suitable for internal combustion engines with cylinder liners.

SUMMARY OF THE INVENTION

The present invention overcomes the above-briefly discussed and other deficiencies of the prior art by providing a novel and improved metallic cylinder head gasket for use on internal combustion engines having cylinder liners. A gasket in accordance with the invention comprises at least one flat cover plate, the outermost plate, which is provided with a plurality of openings. The openings in the cover plate are commensurate with the combustion chambers of the internal combustion engine. A resilient bead extends around each opening, the beads being set back from the edges of the openings. Means defining an annular upward extension of the openings is arranged concentrically with respect to the beads and serves as an upward extension of the combustion spaces. The annular upward extension defining means further act as deformation limiters for the beads. The gasket additionally comprises at least one flat carrier plate.

In a first embodiment, the upward extension defining means are formed by rings or ring segments and the carrier plate engages and supports the beads on the cylinder liner collars. Accordingly, vertical forces which arise when the gasket is clamped between the cylinder head and cylinder block are applied to the cylinder block via the liner collars without the occurrence of a tilting moment.

BRIEF DESCRIPTION OF THE DRAWINGS

The present invention will be better understood, and its numerous objects and advantages will become apparent to those skilled in the art, by reference to the accompanying drawings wherein like reference numerals refer to like elements in the several figures and in which.

DETAILED DESCRIPTION OF THE DISCLOSED EMBODIMENTS

Figure 1:
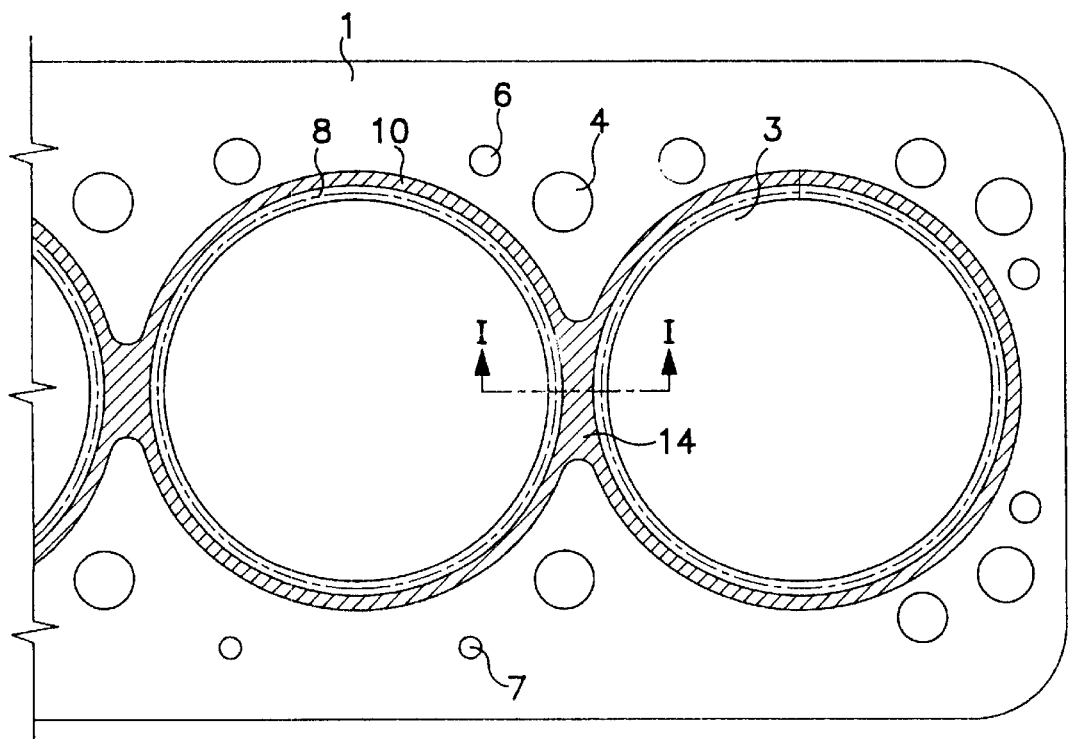
FIG. 1 is a schematic plan view of a cylinder head gasket in accordance with a first embodiment of the invention.
Figure 2:
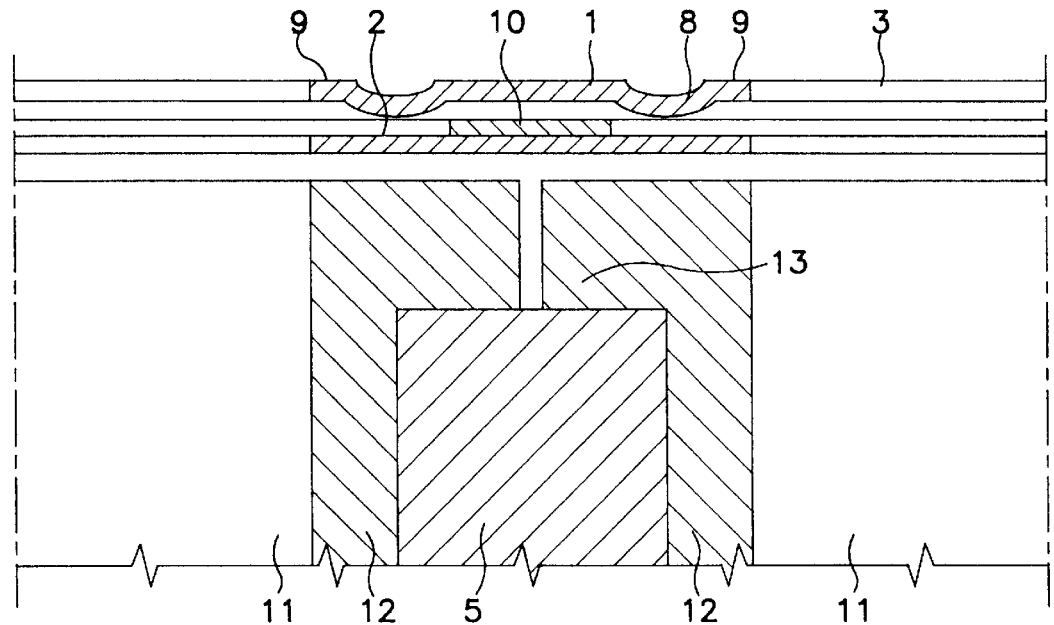
FIG. 2 is a cross-sectional view, taken along the line I—I, of the gasket of FIG. 1 with a cylinder block shown below the gasket.

The multi-layer cylinder head gasket illustrated in FIGS. 1 and 2 comprises an outermost plate or a cover plate 1 and a carrier plate 2. The gasket defines openings 3 which are typically arranged one next to the other in a row. The openings 3 correspond to the combustion spaces, i.e., the cylinders, of an internal combustion engine with which the gasket is designed for use. The gasket further defines holes 4 for bolts which are used to clamp the cylinder head, not shown, to the cylinder block 5 of the engine. In addition, the gasket defines openings 6, 7 through which coolant and oil flows.

The outermost plate, the cover plate 1, which is usually manufactured from a sheet of spring steel and is otherwise planar, is provided with beads 8 which extend around the openings 3 and project towards the carrier plate 2. The beads 8 are spaced from each combustion space opening whereby a straight plate section 9, i.e., a rim region, is provided adjacent each of the openings 3.

In addition, half-beads are usually provided in the cover plate 1 around the fluid flow openings 6, 7 and around the bolt holes 4.

A web member 14 defines "rings" 10 which are arranged on the planar carrier plate 2 generally concentrically with respect to the openings 3. The rings 10, which may be either complete or discontinuous depending on the cylinder spacing, are thus also arranged generally concentrically to the beads 8. The rings 10 are located on the side of the beads 8 disposed away from the openings 3, i.e., the diameter of each ring is greater than that of the coaxial bead. In the embodiment being discussed, the rings 10 define a unitary structure, i.e., are integrally connected to one another, to form a spectacle-like unit.

The cylinder block 5 has cylinder bores 11 into which cylinder liners 12 are inserted. Each cylinder liner 12 is provided with a collar portion 13 which faces the cylinder head.

The rings 10 are arranged in such a way that they are in registration with, and thus indirectly supported by, the liner collars 13. The rings 10 apply vertical forces, which arise when the gasket is clamped between the cylinder head and cylinder block 5, to the cylinder block 5 via the liner collars 13. The rings 10 apply these vertical forces without the occurrence of a tilting moment. The rings 10 also serve to effectively extend the combustion spaces 3 upwardly and thus ensure that the sealing forces are applied to the gasket in a selective manner. The rings 10 further serve as deformation limiters for the beads 8 and, in so doing, limit the spring travel of the beads.

With reference to FIGS. 1 and 2, two adjacent ring segments 10 comprise that portion of web 14 which is located directly between a pair of adjacent openings 3. The web 14 thus extends between two adjacent beads 8 which surround the adjacent openings 3.

Figure 3:
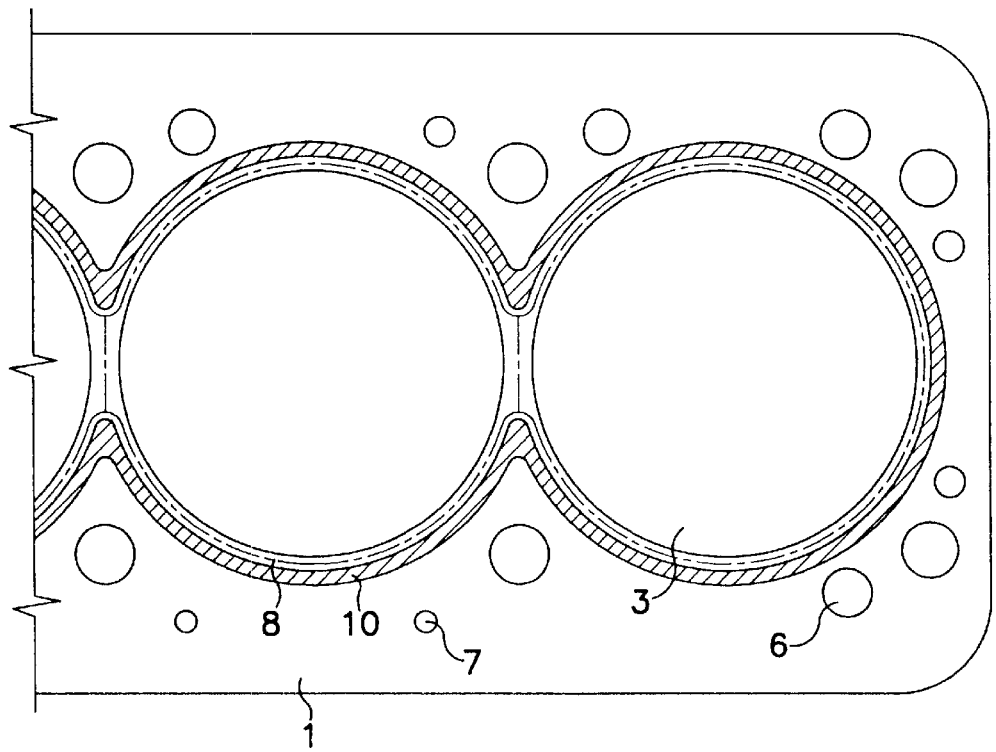
FIG. 3 shows a schematic plan view of a cylinder head gasket in accordance with a second embodiment of the invention.

With reference to FIG. 3, the cylinder bores are arranged very closely to one another. Accordingly, there is insufficient space for the web 14 between the openings 3, the rings thus being incomplete, and the upward extension of the combustion spaces is dispensed with. In the FIG. 3 embodiment, the beads 8 are joined together in the region between two adjacent openings 3 to form a single bead.

Figure 4:
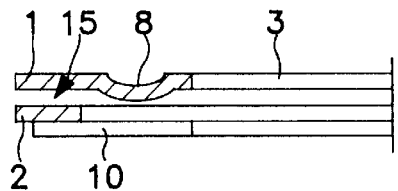
FIG. 4 is a cross-sectional view of a gasket in accordance with a third embodiment of the invention.

With reference to FIG. 4, the rings 10 are located on the side of the carrier plate 2 which faces away from the cover outermost or plate 1. The diameter of the opening 3 in carrier plate 2 is increased so that the carrier plate 2 only extends approximately as far as the outer diameter of the bead 8. The inner diameter of ring 10 is aligned with the edge of the opening 3 in cover plate 1. Ring 10 extends beyond, and thus overlaps, the carrier plate 2 to form an overlapping area 15. The overlapping area comprises a thickened portion of the gasket. This thickened portion is located on the outside of the bead 8 and serves to extend the combustion space upwards in order to apply the sealing forces in a selective manner. The thickened portion also acts as a deformation limiter for the beads 8 and therefore limits the spring travel of the beads. With the gasket clamped between the cylinder head and engine block, the bead 8 is supported on the ring 10 and, as a result of the presence of carrier plate 2, can only be deformed to a limited degree and cannot be pressed flat. Preferably, the carrier plate 2 and ring 8 are of approximately the same thickness.

Figure 5:
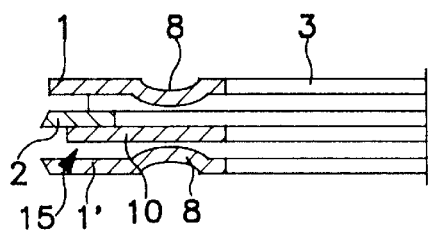
FIG. 5 is a cross-sectional view of a gasket in accordance with a fourth embodiment of the invention.

With reference to FIG. 5, in yet another embodiment, an outermost or a second cover plate 1' is arranged in a mirror-inverted position with respect to the cover plate 1. In order to achieve a symmetrical arrangement in the area 15 between the cover plates 1,1' where the ring 10 overlaps the carrier plate 2, the ring 10 can be bent at a right angle.

Figure 6:
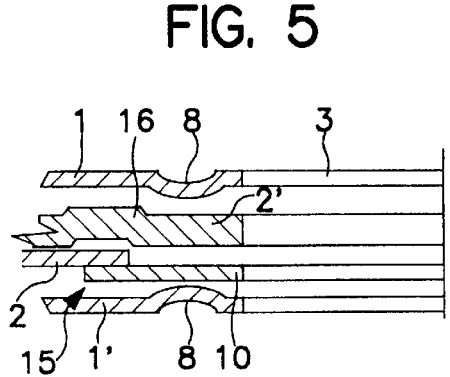
FIG. 6 is a cross-sectional view of a gasket in accordance with a fifth embodiment of the invention.

In the embodiment of FIG. 6, a second thicker carrier plate 2' is provided. The thicker carrier plate 2' preferably has, in the overlap area 15, an offset annular section 16 which is defined by two concentric right-angled bends. The annular section 16 projects outwardly with respect to the plane of carrier plate 2' toward an outermost or cover plate 1 by approximately the thickness of carrier plate 2. The offset 16 of plate 2' receives the edge portion of carrier plate 2, i.e., the portion which extends into the overlapping area 15, when the plate 2 is deformed as a consequence of the gasket being clamped between the head and engine block. Additionally, the bead 8 of the cover plate 1 is protected against excessive deformation by the presence of the annular section 16 while the bead 8 of the cover plate 1' is protected by the thickened portion of the gasket in the overlapping area 15.

Figure 7:
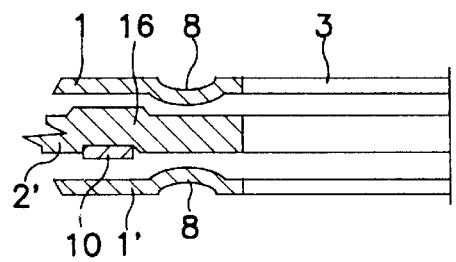
FIG. 7 is a cross-sectional view of a gasket in accordance with a sixth embodiment of the invention.

With reference to FIG. 7, in yet a further embodiment, the carrier plate 2 is eliminated and ring 10 is partly held by the annular section 16 of the carrier plate 2'. The combined action of carrier plate 2' and ring 10 is to provide extensions which protrude from both sides of the carrier plate 2' as shown. By means of the upward extension of the combustion space, the desired protection on the side of the beads 8 facing away from the opening 3 is achieved.

Figure 8:
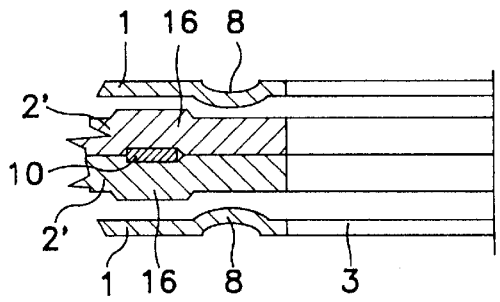
FIG. 8 is a cross-sectional view of a gasket in accordance with a seventh embodiment of the invention.

With reference to FIG. 8, in another embodiment of the invention, two carrier plates 2' arranged in a mirror-inverted manner are provided. Both carrier plates have an offset annular section 16. The annular sections 16 are mirror-inverted and define a groove which receives the ring 10. This construction results in an outward extension on both sides of the composite, i.e., double layer, carrier plate. The extensions provide the upward extension of the combustion space and the bead protection on the side of the beads 8 facing away from the opening 3.

In FIGS. 6 to 8, the annular sections 16, if the cylinder spacing is appropriate, also form an approximately spectacle-like configuration, with or without interconnecting web portions.

The rings 10 are preferably affixed to the carrier plates 2 and 2' by, for example, welding or bonding.

The individual plates of the gasket can be provided, if appropriate, with an elastomeric or softer metal coating over part or all of their surfaces.

Figure 9:
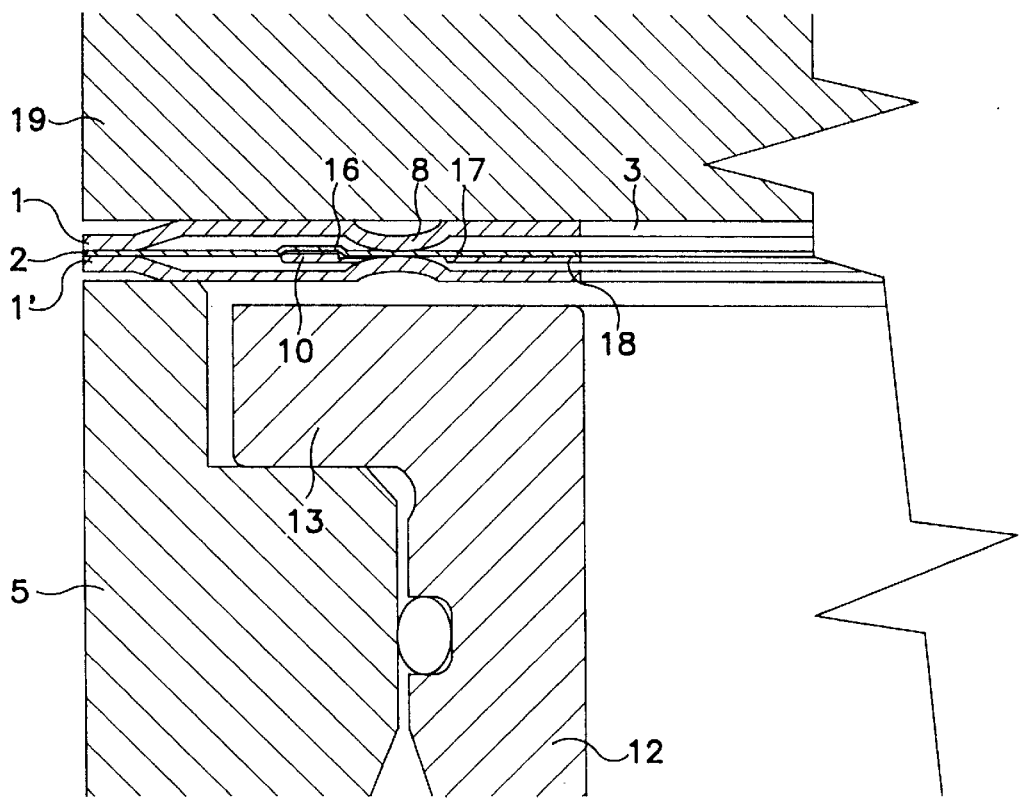
FIG. 9 is a partial cross-sectional schematic view of a cylinder block, cylinder head and an associated gasket in accordance with an eighth embodiment of the invention.

The embodiment of the cylinder head gasket illustrated in FIG. 9 corresponds essentially to the embodiment shown in FIG. 7. The carrier plate 2 is thinner and is provided with an additional right-angled bend 17 adjacent to a combustion space opening 3. An annular inlay 18 is inserted into the area of the carrier plate 2 which is bent at a right angle and surrounds the opening 3. The thickened region of the gasket resulting from the annular inlay 18 is at maximum equal in thickness to the upward extension section formed by the ring 10 and the carrier plate 2. The annular inlay 18 serves to prevent deposits of combustion residues in the area adjacent to the opening 3. The annular inlay 18 also brings about correct compression of the beads 8 when the cylinder block 5 and cylinder head 19 are bolted together. However, the vertical forces which arise when the gasket is clamped between the cylinder head 19 and the cylinder block 5 are applied to the block 5 via the liner collars 13 without the occurrence of an additional tilting moment. The thickness of the upward extension section of the gasket is selected such that it additionally compensates for top spacing or bottom spacing (the latter illustrated) of the liner collars 13 of the cylinder liners 12.

Figure 10:
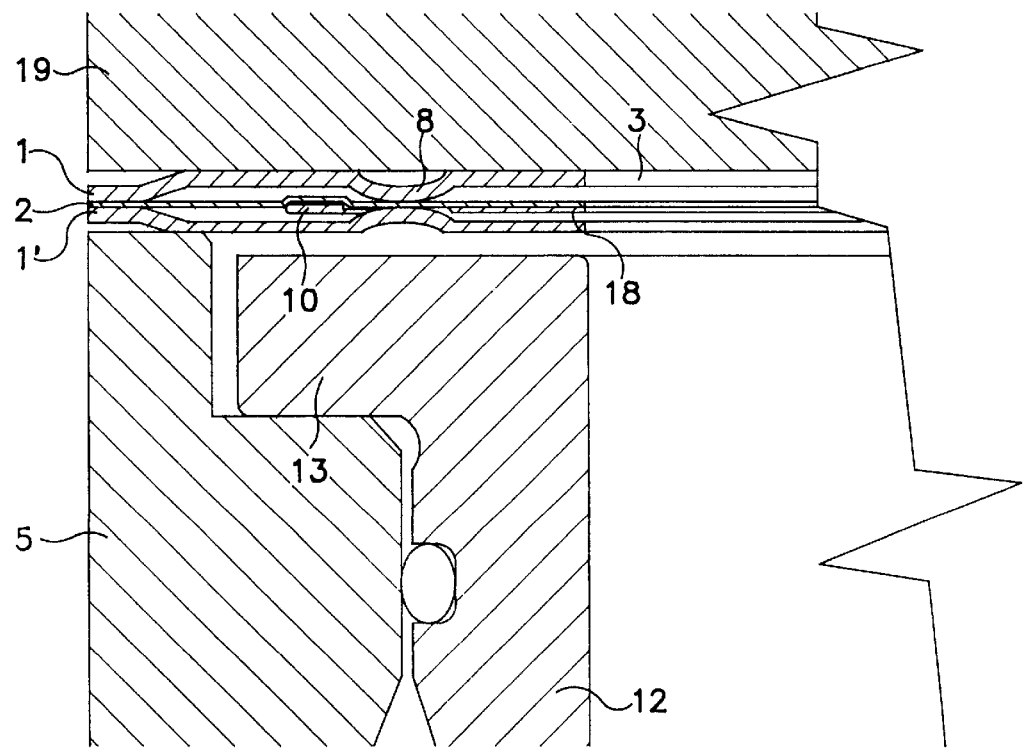
FIG. 10 is a partial cross-sectional schematic view of a cylinder block, cylinder head and an associated gasket in accordance with a ninth embodiment of the invention.

In the embodiment illustrated in FIG. 10, the ring 10 is formed by the folded-over, and possibly bent at a right angle, edge portion of the carrier plate 2 as shown. The closest approach of plate 2 to opening 3 is located outside of the associated beads 8. On the combustion space side, the annular inlay 18 is inserted adjacent to the beads 8 for the same purpose as in the embodiment disclosed in FIG. 9.

While preferred embodiments have been shown and described, various modifications and substitutions may be made thereto without departing from the spirit and scope of the invention. Accordingly, the present invention has been described by way of illustration and not limitation.

We claim:

1. A metallic cylinder head gasket for use with an internal combustion engine having an engine block which defines plural combustion chambers, a cylinder liner being disposed in each combustion chamber and defining a cylindrical combustion space, said liners having collars which extend about open first ends of the combustion spaces, said gasket comprising:

an outermost first cover plate, said cover plate having a plurality of circular openings which define substantially parallel axes extending therethrough, said openings being spaced to be coaxial with respective combustion spaces of the internal combustion engine, said cover plate further having integral resilient beads which extend around and are coaxial with respective of said openings, each said bead having a diameter which exceeds the diameter of its respective opening whereby said beads are spaced from the edges of said openings;

at least a first carrier plate, said first carrier plate and said resilient beads of said cover plate cooperating to define ring seals which extend about the periphery of the combustion spaces of an internal combustion engine when said gasket is clamped between a cylinder head and the engine block of the engine; and means cooperating with said cover and carrier plates to define generally ring-shaped deformation limiting regions of said gasket, the combined thickness of said cover and carrier plates and said deformation limiting regions measured in a direction parallel to the axes of said cover plate openings exceeding the combined thickness of said cover and carrier plates, said deformation limiting regions being arranged coaxially with respect to and extending at least part way around respective resilient beads, said deformation limiting regions being spaced radially outwardly with respect to said cover plate openings a greater distance than that associated with said beads, said outward spacing being selected to position said deformation limiting regions at least in part in registration with the collars of the cylinder liners of the engine, said generally ring-shaped deformation limiting regions cooperating with said cover and carrier plates to limit the deformation of said resilient beads and thereby define the minimum thickness of said gasket in the regions of said beads.

2. The gasket of claim 1 wherein a plurality of said generally ring-shaped deformation limiting regions are integrally connected to one another in a spectacle-like manner.

3. The gasket of claim 2 wherein at least some of said deformation limiting regions share a common portion in the areas between adjacent of said openings.

4. The gasket of claim 2 wherein said deformation limiting regions are discontinuous in areas between adjacent of said openings.

5. The gasket of claim 1 wherein said carrier plate defines a plurality of openings, said carrier plate openings being in axial alignment with associated cover plate openings, each of said carrier plate openings having a diameter which is at least equal to the external diameter of said bead which extends around said associated cover plate opening, and wherein said means for defining deformation limiting regions comprises ring members which at least in part overlap said carrier plate, said ring members each having an inner edge which is disposed substantially flush with the edge of a said opening of said carrier plate.

6. The gasket of claim 5 wherein said ring members are integral with said carrier plate.

7. The gasket of claim 1 wherein said first carrier plate defines a plane and has annular sections which are offset with respect to said plane, said annular sections being disposed between said deformation limiting regions and said cover plate, said annular sections partially receiving said deformation limiting regions.

8. The gasket of claim 7 wherein the thickness of said gasket in said deformation limiting regions is in part defined by the combined thickness of said annular sections and said deformation limiting regions.

9. The gasket of claim 8 further comprising a second carrier plate which at least in part overlaps said first carrier plate annular sections, said deformation limiting regions being arranged so as to at least in part overlap said second carrier plate and be approximately flush with edges of said openings of said cover plate.

10. The gasket of claim 8 further comprising a second carrier plate, said second carrier plate being mirror-symmetrical to said first carrier plate whereby both of said carrier plates comprise said annular sections, said deformation limiting regions being received between said annular sections.

11. The gasket of claim 1 wherein said carrier plate defines a first plane and is provided with openings which are in axial alignment with said cover plate openings, said carrier plate openings each having a diameter, and wherein said deformation limiting regions are formed by folding portions of said carrier plate into a second plane which is substantially parallel to said first plane, said folded portions defining the diameters of said carrier plate openings.

12. The gasket of claim 1 further comprising an annular inlay whose thickness, together with the thickness of said carrier plate, corresponds at maximum to the thickness of said deformation limiting regions, said inlays being located adjacent to said cover plate openings.

* * * * *